United States Patent [19]

Bier et al.

[11] Patent Number: 5,648,414

[45] Date of Patent: Jul. 15, 1997

[54] SCREEN PRINTING INK CONTAINING POLYCARBONATE BINDER

[75] Inventors: Peter Bier, Krefeld; Joachim Wank, Dormagen; Peter Capellen, Krefeld, all of Germany

[73] Assignee: Bayer Aktiengesellschaft, Leverkusen, Germany

[21] Appl. No.: 488,685

[22] Filed: Jun. 8, 1995

[30] Foreign Application Priority Data

Jun. 20, 1994 [DE] Germany .................. 44 21 561.4

[51] Int. Cl.[6] .................................................. C08K 5/13
[52] U.S. Cl. ................. 524/323; 523/161; 260/DIG. 38; 524/326; 524/341
[58] Field of Search .................... 524/323, 326, 524/341; 523/161; 260/DIG. 38

[56] References Cited

U.S. PATENT DOCUMENTS

| | | | |
|---|---|---|---|
| 3,062,781 | 11/1962 | Bottenbruch et al. | 528/202 |
| 5,008,152 | 4/1991 | Mikamo et al. | 428/423.1 |
| 5,055,345 | 10/1991 | Wank et al. | 428/215 |
| 5,312,708 | 5/1994 | Terrell et al. | 430/59 |

*Primary Examiner*—Paul R. Michl
*Assistant Examiner*—John J. Guarriello
*Attorney, Agent, or Firm*—Connolly and Hutz

[57] ABSTRACT

High-temperature-resistant, flexible screen printing inks containing as binder a thermoplastic aromatic polycarbonate with a molecular weight $\overline{M}_w$ (weight average) of at least 10,000 which contains bifunctional carbonate structural units corresponding to formula (I):

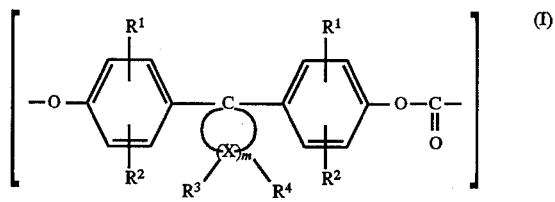

in which $R^1$ and $R^2$ independently of one another represent hydrogen, halogen, $C_{1-8}$ alkyl, $C_{5-6}$ cycloalkyl, $C_{6-10}$ aralkyl, m is an integer of 4 to 7

$R^3$ and $R^4$ may be individually selected for each X and, independently of one another, represent hydrogen or $C_{1-6}$ alkyl and X represents carbon with the proviso that, at least one atom X, $R^3$ and $R^4$ are both alkyl, and halogen-free solvents or solvent mixtures.

4 Claims, No Drawings

SCREEN PRINTING INK CONTAINING POLYCARBONATE BINDER

FIELD OF THE INVENTION

The invention relates to printing ink for screen printing.

BACKGROUND OF THE INVENTION

Screen printing is a versatile and universally usable printing process. The screen printing inks used must of course be adapted to the particular application and to the printed substrate. Like any printing inks, lacquers and coating compositions, screen printing inks contain many components which may be roughly divided into volatile and non-volatile.

The non-volatile components include binders, pigments, fillers and auxiliaries which, in most cases, are only needed in very small quantities for problem-free processing, but are nevertheless indispensable. The volatile constituents are essentially organic solvents and also water. The non-volatile binders ensure that the ink is anchored to the substrate so that the final print withstands the effects of abrasion, heat and mechanical distortion.

Accordingly, the binders required (for example for the abrasion-resistant surface modification of injection-molded articles by insert molding) should not melt at the high temperatures used for injection molding, should adhere firmly to the substrate and should be flexible. These requirements are satisfied by special highly heat-resistant polycarbonates.

SUMMARY OF THE INVENTION

The present invention relates to high-temperature-resistant flexible screen printing inks containing
A) as binder at least one polycarbonate based on geminally disubstituted dihydroxydiphenyl cycloalkanes and
B) as solvent halogen-free solvents or solvent mixtures.

DESCRIPTION OF PREFERRED EMBODIMENTS

Suitable polycarbonates A are preferably high molecular weight, thermoplastic aromatic polycarbonates with $\overline{M}_w$ (weight average molecular weight) values of at least 10,000 and preferably in the range from 20,000 to 300,000 which contain bifunctional carbonate structural units corresponding to formula (I):

$$\left[ -O - \underset{R^2}{\underset{|}{\bigcirc}}^{R^1} - \underset{R^3}{\overset{1}{\underset{R^4}{C}}} (X)_m - \underset{R^2}{\underset{|}{\bigcirc}}^{R^1} - O - \underset{\parallel}{\overset{}{C}} - \right]_{\quad} \quad (I)$$

in which
$R^1$ and $R^2$ independently of one another represent hydrogen, halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$-alkyl, more particularly benzyl,
m is an integer of 4 to 7, preferably 4 or 5,
$R^3$ and $R^4$ may be individually selected for each X and, independently of one another, represent hydrogen or $C_{1-6}$ alkyl and
X is carbon,
with the proviso that, at at least one atom X, $R^3$ and $R^4$ are both alkyl.

Starting products for the polycarbonates A are dihydroxydiphenyl cycloalkanes corresponding to formula (Ia):

$$\text{HO} - \underset{R^2}{\underset{|}{\bigcirc}}^{R^1} - \underset{R^3}{\overset{1}{\underset{R^4}{C}}} (X)_m - \underset{R^2}{\underset{|}{\bigcirc}}^{R^1} - \text{OH}, \quad \text{(Ia)}$$

in which
X, $R^1$, $R^2$, $R^3$, $R^4$ and m are as defined for formula (I).
Preferably at 1 to 2 atoms X and, more preferably, at only one atom X, $R^3$ and $R^4$ are both alkyl.

The preferred alkyl radical is methyl; the X atoms in the α-position to the diphenyl-substituted C atom (C-1) are preferably not dialkyl-substituted whereas those in the β-position to C-1 are preferably dialkyl-substituted.

Preferred dihydroxydiphenyl cycloalkanes are those with 5 and 6 ring C atoms in the cycloaliphatic component (m=4 or 5 in formula (Ia)), for example diphenols corresponding to formula (Ib) to (Id):

$$\text{HO} - \bigcirc^{R^1}_{R^2} - \overset{1}{C} \underset{H_3C}{\overset{CH_3}{\diagdown}} \underset{CH_3}{\overset{CH_3}{\diagup}} - \bigcirc^{R^1}_{R^3} - \text{OH}, \quad \text{(Ib)}$$

$$\text{HO} - \bigcirc^{R^1}_{R^2} - \overset{1}{C} \underset{}{\overset{CH_3}{\diagdown CH_3}} - \bigcirc^{R^1}_{R^3} - \text{OH}, \quad \text{(Ic)}$$

$$\text{HO} - \bigcirc^{R^1}_{R^2} - \overset{1}{C} \underset{H_3C}{\overset{CH_3}{\diagdown CH_3}} - \bigcirc^{R^1}_{R^3} - \text{OH}, \quad \text{(Id)}$$

1,1-bis-(4-hydroxyphenyl)-3,3,5-trimethyl cyclohexane (formula (Ib) with $R^1$ and $R^2$=H) being particularly preferred. The polycarbonates A may be prepared from diphenols corresponding to formula (Ia) in accordance with German patent application P 3 832 396.6 (Le A 26 344).

It is possible to use both a single diphenol corresponding to formula (Ia), in which case homopolycarbonates are formed, and also several diphenols corresponding to formula (Ia), in which copolycarbonates are formed.

In addition, the diphenols corresponding to formula (Ia) may also be used in admixture with other diphenols, for example with those corresponding to formula (Ie):

HO—Z—OH (Ie)

for the production of high molecular weight, thermoplastic aromatic polycarbonates.

Suitable other diphenols corresponding to formula (Ie) are those in which Z is an aromatic radical containing 6 to 30 carbon atoms which may contain one or more aromatic nuclei, may be substituted and may contain aliphatic radicals or other cycloaliphatic radicals than those corresponding to formula (Ia) or hetero atoms as bridge members.

Examples of the diphenols corresponding to formula (Ie) are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropyl benzenes and nucleus-alkylated and nucleus-halogenated compounds thereof.

These and other suitable diphenols are described, for example, in U.S. Pat. Nos. 3,028,365, 2,999,835, 3,148,172, 3,275,601, 2,991,273, 3,271,367, 3,062,781, 2,970,131 and 2,999,846, in DE-A 1 570 703, 2 063 050, 2 063 052, 2 211 956, in FR-A 1 561 518 and in the book by H. Schnell entitled "Chemistry and Physics of Polycarbonates", Interscience Publishers, New York 1964.

Preferred other diphenols are, for example, 4,4'-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-cyclohexane, α,α-bis-(4-hydroxyphenyl)-p-diisopropyl benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropyl benzene, 2,2-bis-(3,5-dichloro-4-hydroxyphenyl)-propane and 2,2-bis-(3,5-dibromo-4-hydroxyphenyl)-propane.

Particularly preferred diphenols corresponding to formula (Ie) are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

2,2-Bis-(4-hydroxyphenyl)-propane is particularly preferred. The other diphenols may be used individually and in admixture.

The molar ratio of diphenols corresponding to formula (Ia) to the other optional diphenols corresponding to formula (Ie) should be between 100 mole-% (Ia) : 0 mole-% (Ie) and 2 mole-% (Ia) : 98 mole-% (Ie), preferably between 100 mole-% (Ia) : 0 mole-% (Ie) and 10 mole-% (Ia): 90 mole-% (Ie), more preferably between 100 mole-% (Ia) : 0 mole-% (Ie) and 30 mole-% (Ia) : 70 mole-% (Ie) and most preferably between 100 mole-% (Ia): 0 mole-% (Ie) and 50 mole-% (Ia): 50 mole-% (Ie).

The high molecular weight polycarbonates of the diphenols corresponding to formula (Ia), optionally in combination with other diphenols, may be prepared by known methods for the production of polycarbonates. The various diphenols may be attached to one another both statistically and also blockwise.

The polycarbonates according to the invention may be branched in known manner. If branching is required, it may be achieved in known manner by co-condensation of small quantities, preferably quantities of 0.05 to 2.0 mole-% (based on the diphenols used), of trifunctional or more than trifunctional compounds, more particularly those containing three or more than three phenolic hydroxyl groups. Examples of branching agents containing three or more than three phenolic hydroxyl groups include phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5-methylbenzyl)-4-methylphenol, 2-(4-hydroxyphenyl)-2-(2,4-dihydroxyphenyl)-propane, hexa-[4-(4-hydroxyphenylisopropyl)-phenyl]-orthoterephthalic acid ester, tetra-(4-hydroxyphenyl)-methane, tetra-[4-(4-hydroxyphenylisopropyl)-phenoxy]-methane and 1,4-bis-[4',4"-dihydroxytriphenyl)-methyl]-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Chain terminators for regulating the molecular weight of the polycarbonates A in known manner are monofunctional compounds in typical concentrations. Suitable compounds are, for example, phenol, tert.butylphenols or other alkyl-substituted phenols. Small quantities of phenols corresponding to formula (If):

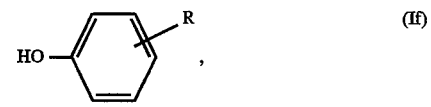

in which

R is a branched $C_8$ and/or $C_9$ alkyl radical, are particularly suitable for regulating molecular weight.

The percentage of $CH_3$ protons in the alkyl radical R is preferably between 47 and 89% while the percentage of CH and $CH_2$ protons is between 53 and 11%. R is preferably in the o-position and/or p-position to the OH group. In a particularly preferred embodiment, the upper limit to the ortho component is 20%. The chain terminators are generally used in quantities of 0.5 to 10 mole-% and preferably in quantities of 1.5 to 8 mole-%, based on the diphenols used.

The polycarbonates A may advantageously be prepared in known manner by the interfacial process (cf. H. Schnell "Chemistry and Physics of Polycarbonates", Polymer Reviews, Vol. IX, pages 33 et seq., Interscience Publ. 1964).

In this process, the diphenols corresponding to formula (Ia) are dissolved in an aqueous alkaline phase. To produce copolycarbonates with other diphenols, mixtures of diphenols (Ia) and the other diphenols, for example those corresponding to formula (Ie), are used. Chain terminators, for example corresponding to formula (If), may be added to regulate molecular weight. The solution is then reacted with phosgene by the interfacial condensation method in the presence of an inert organic phase which preferably dissolves polycarbonate. The reaction temperature is between 0° C. and 40° C.

The branching agents optionally used (preferably 0.05 to 2.0 mole-%) may either be initially introduced with the diphenols in the aqueous alkaline phase or may be added before phosgenation in the form of a solution in the organic solvent. Besides the diphenols (Ia) and the other optional diphenols (Ie), mono- and/or bis-chlorocarbonic acid esters thereof may also be used, being added in the form of a solution in organic solvents. In this case, the quantity of chain terminators and branching agents is determined by the molar quantity of diphenolate units corresponding to formula (Ia) and optionally formula (Ie); where chlorocarbonic acid esters are used, the quantity of phosgene may be correspondingly reduced in known manner.

Suitable organic solvents for the chain terminators and optionally for the branching agents and the chlorocarbonic acid esters are, for example, methylene chloride, chlorobenzene, more particularly mixtures of methylene chloride and chlorobenzene. The chain terminators and branching agents used may optionally be dissolved in the same solvent.

Methylene chloride, chlorobenzene and mixtures of methylene chloride and chlorobenzene, for example, is/are used as the organic phase for the interfacial polycondensation reaction.

NaOH solution, for example, is used as the aqueous alkaline phase. The production of the polycarbonates A by the interfacial process may be catalyzed in the usual way by such catalysts as tertiary amines, more particularly tertiary aliphatic amines, such as tributylamine or triethylamine. The catalysts may be used in quantities of 0.05 to 10 mole-%, based on moles of diphenols used. The catalysts may be added before the beginning of phosgenation or during or even after phosgenation.

The polycarbonates A may be produced by the known process in homogeneous phase, the so-called "pyridine process", and by the known melt transesterification process using diphenyl carbonate, for example, instead of phosgene.

The polycarbonates A preferably have molecular weights $\overline{M}_w$ (weight average, as determined by gel chromatography after preliminary calibration) of at least 10,000, more preferably in the range from 20,000 to 300,000 and most preferably in the range from 20,000 to 80,000. They may be linear or branched and are homopolycarbonates or copolycarbonates based on the diphenols (Ia).

The incorporation of the diphenols (Ia) provides for the formation of new polycarbonates characterized by high heat resistance and other favorable properties. This applies in particular to polycarbonates based on diphenols corresponding to formula (Ia), in which m is 4 or 5, and especially to polycarbonates based on diphenols corresponding to formula (Ib), in which $R^1$ and $R^2$ independently of one another have the meanings defined for formula (Ia) and, in a particularly preferred embodiment, represent hydrogen.

Accordingly, the particularly preferred polycarbonates A are those of structural units corresponding to formula (I), in which m is 4 or 5, more particularly those of structural units corresponding to formula (Ig):

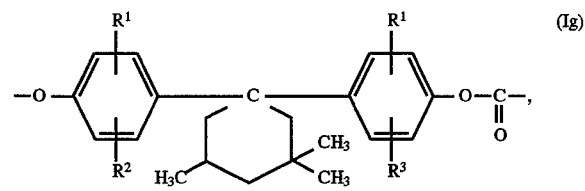

in which $R^1$ and $R^2$ are as defined for formula (I), but are preferably hydrogen.

These polycarbonates based on diphenols corresponding to formula (Ib), in which in particular $R^1$ and $R^2$ are hydrogen, unexpectedly show high UV stability and good melt flow behavior in addition to high heat resistance.

In addition, the properties of the polycarbonates can be favorably varied by combination with other diphenols, more particularly with those corresponding to formula (Ie). In copolycarbonates such as these, the diphenols corresponding to formula (Ia) are present in quantities of 100 mole-% to 2 mole-%, preferably in quantities of 100 mole-% to 10 mole-%, more preferably in quantities of 100 mole-% to 30 mole-% and most preferably in quantities of 100 mole-% to 50 mole-%, based on the total quantity of 100 mole-% of diphenol units.

Halogen-free solvents (B) are, in particular, aliphatic, cycloaliphatic, aromatic hydrocarbons, such as toluene, xylene; ketones, such as acetone, methyl isobutyl ketone, isophorone, butanone; esters, such as methyl acetate, ethyl acetate, butyl acetate, methoxypropyl acetate.

Preferred solvents are toluene, xylene, methyl acetate, ethyl acetate, methyl isobutyl ketone, butanone, methoxypropyl acetate.

Particularly preferred solvents are toluene, xylene, ethyl acetate, methyl ethyl ketone.

EXAMPLE

To illustrate the invention, a screen printing ink with the following composition:

12 parts by weight pigments, fillers, auxiliaries
30 parts by weight polycarbonate (Ia):

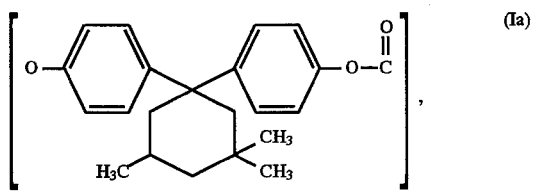

with a molecular weight $\overline{M}_w$ of 47,000 58 parts by weight Solvesso 100, a hydrocarbon solvent from Esso was prepared and used to print a polycarbonate film. The film thus printed was placed in an injection mold and insert molded with polycarbonate at 300 ° C. The colored printed pattern remained rich in contrast (no melting of the screen printing ink) and showed high adhesion to the polycarbonate.

An equally good result was obtained with a copolycarbonate corresponding to the following formula:

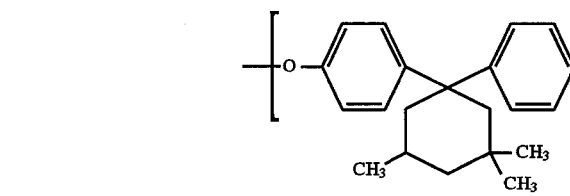

molecular weight $\overline{M}_w$ 37,000.

In a comparison test carried out with a screen printing ink containing a polyacrylate as binder, the colored printed pattern was smeared.

We claim:

1. screen printing inks containing as binder a thermoplastic aromatic polycarbonate with a molecular weight $\overline{M}_w$ (weight average) of at least 10,000 and which polycarbonate contains bifunctional carbonate structural units corresponding to formula (I):

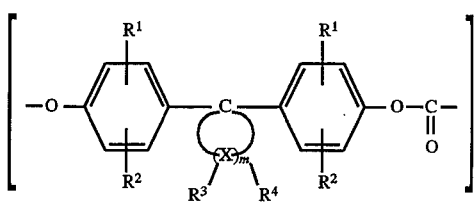 (I)

in which

R¹ and R² independently of one another represent hydrogen, halogen, $C_{1-8}$ alkyl, $C_{5-6}$ cycloalkyl, $C_{6-10}$ aralkyl, m is an integer of 4 to 7, R³ and R⁴ may be individually selected for each X and, independently of one another, represent hydrogen or $C_{1-6}$ alkyl and X represents carbon, with the proviso that, at least one atom X, R³ and R⁴ are both alkyl, and halogen-free solvents or solvent mixtures.

2. Screen printing inks as claimed in claim 1, in which the aromatic polycarbonate contains at least 30 mole-% of the bifunctional carbonate structural unit corresponding to formula (I).

3. Screen printing inks as claimed in claim 1, in which the aromatic polycarbonate has a molecular weight $\overline{M}_w$ (weight average) in the range from 10,000 to 300,000.

4. Screen printing inks as claimed in claim 1 containing aromatic hydrocarbons, ketones, esters, ethers, alcohols or phenols as solvent.

* * * * *